(12) United States Patent
Yao et al.

(10) Patent No.: US 9,590,487 B2
(45) Date of Patent: Mar. 7, 2017

(54) METHOD AND CIRCUIT FOR REDUCING RIPPLE OF CURRENT OUTPUT BY CURRENT SOURCE

(71) Applicant: INVENTRONICS (HANGZHOU), INC., Hangzhou, Zhejiang (CN)

(72) Inventors: Xiaoli Yao, Hangzhou (CN); Liang'an Ge, Hangzhou (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 29 days.

(21) Appl. No.: 14/768,120

(22) PCT Filed: Dec. 10, 2013

(86) PCT No.: PCT/CN2013/088945
§ 371 (c)(1),
(2) Date: Aug. 14, 2015

(87) PCT Pub. No.: WO2014/127662
PCT Pub. Date: Aug. 28, 2014

(65) Prior Publication Data
US 2015/0381028 A1    Dec. 31, 2015

(30) Foreign Application Priority Data
Feb. 20, 2013    (CN) .................. 2013 1 0053985

(51) Int. Cl.
G05F 1/56    (2006.01)
H02M 1/14    (2006.01)
H05B 33/08    (2006.01)

(52) U.S. Cl.
CPC .......... *H02M 1/14* (2013.01); *H05B 33/0815* (2013.01); *H05B 33/089* (2013.01); *Y02B 20/347* (2013.01)

(58) Field of Classification Search
CPC . G05F 1/56; G05F 1/575; G05F 3/135; G05F 3/145; H02M 1/14; H02M 3/156;
(Continued)

(56) References Cited

U.S. PATENT DOCUMENTS 6,049,200 A * 4/2000 Hayashimoto .......... G05F 1/565
                                                              323/269
6,969,976 B1 * 11/2005 Broach .................. H02M 3/156
                                                              323/222
(Continued)

FOREIGN PATENT DOCUMENTS

CN    101640477 A    2/2010
CN    102203690 A    9/2011
(Continued)

OTHER PUBLICATIONS

International Search Report (English and Chinese) and Written Opinion of the ISA (Chinese) for PCT/CN2013/088945, ISA/CN, mailed Mar. 13, 2014.

*Primary Examiner* — Adolf Berhane
(74) *Attorney, Agent, or Firm* — Harness, Dickey & Pierce, P.L.C.

(57) ABSTRACT

Disclosed are a method and circuit for reducing a ripple of a current output by a current source. The circuit for reducing a ripple of a current output by a current source comprises a tube with adjustable impedance and a control circuit. The control circuit detects a direct current output by the current source to obtain a first signal which is in proportion to the direct current, and by comparing an instantaneous value of the first signal with an amplitude value of a set signal, controlling the increase of the impedance of the tube with adjustable impedance when the instantaneous value of the first signal is greater than the amplitude value of the set signal, so as to enable the amplitude value of the first signal to not exceed the amplitude value of the set signal and then (Continued)

enable the amplitude value of the current output by the current source to not exceed the amplitude value of the set current of the set signal, so that the purpose of reducing the ripple of the direct current output by the current source is finally achieved.

10 Claims, 6 Drawing Sheets

(58) Field of Classification Search
CPC ............ H02M 3/155; H02M 2201/516; H05B 33/0815; H05B 33/0836; H05B 33/0803
USPC .................. 323/222, 265, 266, 273; 363/45; 315/224, 291, 307
See application file for complete search history.

(56) References Cited

U.S. PATENT DOCUMENTS

| | | | |
|---|---|---|---|
| 7,622,902 B1* | 11/2009 | Kao | G05F 1/575 323/276 |
| 8,237,418 B1* | 8/2012 | Krishna | G05F 1/575 323/273 |
| 8,310,172 B2 | 11/2012 | Negrete | |
| 8,519,692 B2* | 8/2013 | Nakashima | G05F 1/56 323/288 |
| 8,525,498 B2 | 9/2013 | Yang et al. | |
| 8,710,766 B2 | 4/2014 | Kanamori et al. | |
| 9,459,635 B2* | 10/2016 | Dally | G05F 1/10 |
| 2003/0117189 A1* | 6/2003 | Beghein | H03L 7/0895 327/156 |
| 2003/0147193 A1* | 8/2003 | Hamon | G05F 1/573 361/87 |
| 2008/0094045 A1* | 4/2008 | Lin | G05F 1/56 323/274 |
| 2008/0100276 A1* | 5/2008 | Negoro | G05F 1/565 323/285 |
| 2010/0026270 A1 | 2/2010 | Yang et al. | |
| 2010/0141174 A1 | 6/2010 | Negrete | |
| 2012/0217900 A1 | 8/2012 | Kanamori et al. | |
| 2014/0085945 A1 | 3/2014 | Kuang et al. | |
| 2014/0117957 A1* | 5/2014 | Usuda | G05F 1/575 323/280 |
| 2014/0340067 A1* | 11/2014 | Zhong | G05F 3/08 323/311 |
| 2015/0115809 A1* | 4/2015 | Siessegger | H05B 33/0803 315/185 R |
| 2015/0205313 A1* | 7/2015 | Tomioka | G05F 1/575 323/280 |
| 2016/0285260 A1* | 9/2016 | Kawasoe | H02H 9/045 |

FOREIGN PATENT DOCUMENTS

| | | |
|---|---|---|
| CN | 202135363 U | 2/2012 |
| CN | 102638917 A | 8/2012 |
| CN | 102655702 A | 9/2012 |
| CN | 102665324 A | 9/2012 |
| CN | 202602987 U | 12/2012 |
| CN | 102904427 A | 1/2013 |
| CN | 103200734 A | 7/2013 |

* cited by examiner

METHOD AND CIRCUIT FOR REDUCING RIPPLE OF CURRENT OUTPUT BY CURRENT SOURCE

The present application is the national phase of International Application No. PCT/CN2013/088945, titled "METHOD AND CIRCUIT FOR REDUCING RIPPLE OF CURRENT OUTPUT BY CURRENT SOURCE", filed on Dec. 10, 2013, which claims a priority to Chinese Patent Application No. 201310053985.X, titled "METHOD AND CIRCUIT FOR REDUCING RIPPLE OF CURRENT OUTPUT BY CURRENT SOURCE", filed on Feb. 20, 2013 with the Chinese State Intellectual Property Office, which are incorporated herein by reference in their entireties.

TECHNICAL FIELD

The present disclosure relates to the technical field of current source, and in particular, to a method and a circuit for reducing a ripple of a current output by a current source.

BACKGROUND

The current source is able to provide a current maintaining at a specific value (specifically, including cases that an amplitude value of an output current is a unique rated value and an amplitude value of an output current is adjustable within a certain range); thus, the current source has a wide range of applications. However, a direct current output by the current source has ripple due to an internal circuit of the current source, i.e., the direct current output by the current source includes an alternating component.

Specifically, an LED driver is a typical current source. The LED driver includes an LED driver capable of providing an LED Light with a direct current having a constant amplitude value, and an LED driver capable of providing an LED light with a direct current whose amplitude value is adjustable within a certain range, i.e., an LED driver having a dimming function.

However, in a case that the speed of a current controlling loop is low, or the capacity of a filter is small, the output current of the LED driver includes not only direct component but also alternating component, that is, current ripple occurs. In a case that the current having ripple flows through the LED light, the brightness of the LED light may change with the ripple of current, i.e., stroboscopic phenomenon occurs.

The stroboscopic phenomenon may influence the service life of the LED light, and accordingly, how to reduce the ripple of the current output by the current source becomes an urgent problem to be solved.

In addition, different current sources output currents having different amplitude values, and amounts of ripples in the currents may be different; meanwhile, for a current source whose current amplitude is adjustable, different amplitudes may result in different amounts of ripples. Thus, it is particularly important to reduce the ripples of the currents output by different current sources or by one current source whose current amplitude is adjustable.

SUMMARY

In view of the above, a method and a circuit for reducing a ripple of a current output by a current source are provided according to embodiments of the present disclosure, to reduce the ripple of the current output by the current source; and for current sources outputting currents of different amplitude values, ripples of the output currents can also be reduced.

A circuit for reducing a ripple of a current output by a current source is provided according to an embodiment of the present disclosure. An output terminal of the current source is connected to a load, and a current output by the current source has a ripple. The circuit includes an adjustable impedance tube and a control circuit, where:

the adjustable impedance tube is connected in series with the load through a first terminal and a second terminal of the adjustable impedance tube, and a control terminal of the adjustable impedance tube is connected to an output terminal of the control circuit; and the control circuit is configured to, acquire a direct current output by the current source and obtain a first signal in proportion to the direct current; acquire an average value of the direct current output by the current source and obtain a setting signal associated with the average value of the direct current; and output a control signal for increasing an impedance of the adjustable impedance tube in a case that an instantaneous value of the first signal is sensed to be greater than an amplitude value of the setting signal; where the control signal adjusts the impedance of the adjustable impedance tube through controlling a voltage or a current at the control terminal of the adjustable impedance tube.

Preferably, the control circuit includes a first signal acquisition circuit, a setting signal acquisition circuit and a comparison circuit;

the first signal acquisition circuit is configured to, acquire the direct current output by the current source, obtain the first signal in proportion to the direct current, and transmit the first signal to the comparison circuit;

the setting signal acquisition circuit is configured to, acquire the average value of the direct current output by the current source, obtain the setting signal, and transmit the setting signal to the comparison circuit, where the setting signal is higher than the average value of the first signal by a fixed value or is in a fixed proportion to the average value of the first signal;

the comparison circuit is configured to, compare the received first signal with the setting signal, and generate the control signal for increasing the impedance of the adjustable impedance tube in a case that the instantaneous value of the first signal is greater than the amplitude value of the setting signal, to increase the impedance of the adjustable impedance tube and to ensure that the instantaneous value of the first signal does not exceed the amplitude value of the setting signal.

Preferably, the first signal acquisition circuit includes a sense resistor, a first resistor, and a second resistor, where:

the sense resistor is connected in series with the adjustable impedance tube;

the first resistor and the second resistor are connected in series and then connected in parallel to the sense resistor;

the setting signal acquisition circuit includes a third resistor and a first capacitor, and the third resistor and the first capacitor are connected in series and then connected in parallel to the sense resistor; and a first input terminal of the comparison circuit is connected to a common terminal of the first resistor and the second resistor, a second input terminal of the comparison circuit is connected to a common terminal of the third resistor and the first capacitor, and an output terminal of the comparison circuit is connected to the control terminal of the adjustable impedance tube.

Preferably, the control circuit includes a first signal acquisition circuit, a setting signal acquisition circuit and a comparison circuit;

the first signal acquisition circuit is configured to, acquire the direct current output by the current source, obtain the first signal in proportion to the direct current, and transmit the first signal to the comparison circuit:

the setting signal acquisition circuit is configured to, acquire a voltage across the adjustable impedance tube, dynamically adjust the output setting signal based on a result of a comparison between the voltage across the adjustable impedance tube and a preset range, and transmit the setting signal to the comparison circuit; where the setting signal has a minimum value, and a current set by the setting signal of the minimum value is no less than the average value of the direct current output by the current source, and a lower limit value of the preset range is greater than a saturation voltage drop of the adjustable impedance tube; and the comparison circuit is configured to, compare an instantaneous value of the first signal with an amplitude value of the setting signal, and generate the control signal for increasing the impedance of the adjustable impedance tube in a case that the instantaneous value of the first signal is greater than the amplitude value of the setting signal, to increase the impedance of the adjustable impedance tube and to ensure that the amplitude value of the first signal does not exceed the amplitude value of the setting signal.

Preferably, the first signal acquisition circuit includes a sense resistor, one terminal of the sense resistor is connected to the second terminal of the adjustable impedance tube, the other terminal of the sense resistor is connected to an output terminal of the current source, and a common terminal of the sense resistor and the adjustable impedance tube is connected to a first input terminal of the comparison circuit;

a first terminal of the setting signal acquisition circuit is connected to the first terminal of the adjustable impedance tube, a second terminal of the setting signal acquisition circuit is connected to the second terminal of the adjustable impedance tube, and an output terminal of the setting signal acquisition circuit is connected to a second input terminal of the comparison circuit;

an output terminal of the comparison circuit is connected to the control terminal of the adjustable impedance tube.

Preferably, the setting signal acquisition circuit is specifically configured to:

in a case that the voltage across the adjustable impedance tube is sensed to be within the preset range, maintain the setting signal at a current value;

in a case that the voltage across the adjustable impedance tube is sensed to be less than the lower limit value of the preset range, decrease the amplitude value of the setting signal until the voltage across the adjustable impedance tube falls within the preset range or the setting signal reaches the minimum value; and in a case that the voltage across the adjustable impedance tube is sensed to be greater than an upper limit value of the preset range, increase the amplitude value of the setting signal until the voltage across the adjustable impedance tube falls within the preset range.

A method for reducing a ripple of a current output by a current source is further provided in the present disclosure. The method is applied to a circuit for reducing the ripple of the current output by the current source, where the circuit for reducing the ripple of the current output by the current source at least includes an adjustable impedance tube and a control circuit for controlling an impedance of the adjustable impedance tube, and the adjustable impedance tube and a load are connected in series between output terminals of the current source. The method includes:

acquiring a direct current output by the current source, and obtaining a first signal in proportion to the direct current;

acquiring an average value of the direct current output by the current source, and obtaining a setting signal associated with the average value of the direct current;

comparing an instantaneous value of the first signal with an amplitude value of the setting signal, and obtaining a comparison result; and increasing the impedance of the adjustable impedance tube to ensure that the amplitude value of the first signal does not exceed the amplitude value of the setting signal, in a case that the comparison result indicates that the instantaneous value of the first signal is greater than the amplitude value of the setting signal.

Preferably, the setting signal is higher than the average value of the first signal by a fixed value, or the setting signal is in a fixed proportion to the average value of the first signal.

Preferably, after acquiring the average value of the direct current output by the current source and before obtaining the setting signal, the method further comprises:

sensing a voltage across the adjustable impedance tube, and dynamically adjusting the amplitude value of the output setting signal based on a result of a comparison between the voltage across the adjustable impedance tube and a preset range, where the setting signal has a minimum value, a current set by the setting signal of the minimum value is no less than the average value of the direct current output by the current source, and a lower limit value of the preset range is greater than a saturation voltage drop of the adjustable impedance tube.

Preferably, the dynamically adjusting the amplitude value of the setting signal based on a result of a comparison between the voltage across the adjustable impedance tube and a preset range specifically includes:

in a case that the voltage across the adjustable impedance tube is sensed to be within the preset range, maintaining the setting signal at a current value;

in a case that the voltage across the adjustable impedance tube is sensed to be less than the lower limit value of the preset range, decreasing the amplitude value of the setting signal until the voltage across the adjustable impedance tube falls within the preset range or the setting signal reaches the minimum value; and in a case that the voltage across the adjustable impedance tube is sensed to be greater than an upper limit value of the preset range, increasing the amplitude value of the setting signal until the voltage across the adjustable impedance tube falls within the preset range.

It may be understood from the technical solutions according to the embodiments of the present disclosure that, in the method and circuit for reducing the ripple of the current output by the current source, the instantaneous value of the sensed first signal in proportion to the direct current output by the current source is compared with the amplitude value of the setting signal, and the impedance of the adjustable impedance tube is adjusted based on a comparison result. Since the setting signal is obtained based on the average value of the direct current, ripples of currents output by different current sources or ripples of different currents output by a same current source can be reduced through controlling the impedance of the adjustable impedance tube.

BRIEF DESCRIPTION OF THE DRAWINGS

In order to illustrate technical solutions according to the embodiments of the present disclosure or in the conventional technology more clearly, drawings to be used in the description of the embodiments or the conventional technology are described briefly hereinafter. Apparently, the drawings described hereinafter are only for some embodiments of the present disclosure, and other drawings may be obtained by those skilled in the art based on those drawings without creative effort.

DETAILED DESCRIPTION

To allow those skilled in the art to understand the technical solutions in the present disclosure better, hereinafter, technical solutions according to embodiments of the present disclosure are described clearly and completely in conjunction with drawings. Apparently, the described embodiments are only a few rather than all of the embodiments of the present disclosure. All other embodiments obtained by those skilled in the art based on the embodiments of the present disclosure without creative effort shall fall within the protection scope of the present disclosure.

Figure 1:
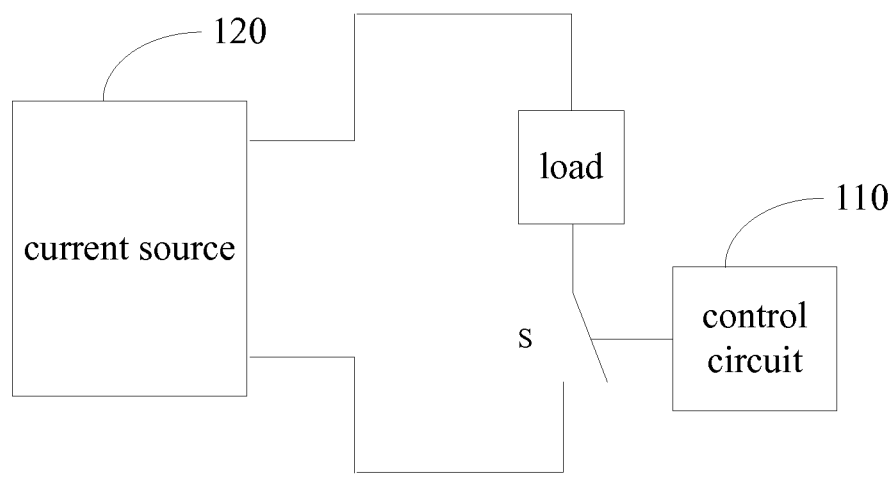
FIG. 1 is a schematic diagram of a circuit for reducing a ripple of a current output by a current source according to an embodiment of the present disclosure.

Reference is made to FIG. 1, which is a schematic diagram of a circuit for reducing a ripple of a current output by a current source according to an embodiment of the present disclosure.

As shown in FIG. 1, the circuit for reducing the ripple of the current output by the current source includes an adjustable impedance tube S and a control circuit 110;

where a load and the adjustable impedance tube S are connected in series and are connected to two output terminals of a current source 120, and a direct current output by the current source 120 has a ripple.

The adjustable impedance tube S has a first terminal connected to a terminal of the load and a second terminal connected to an output terminal of the current source 120, a control terminal of the adjustable impedance tube S is connected to an output terminal of the control circuit 110.

The control circuit 110 is configured to acquire the direct current output by the current source 120, obtain a first signal which is in proportion to the direct current, acquire an average value of the direct current output by the current source, and obtain a setting signal associated with the average value of the direct current.

The control circuit compares an instantaneous value of the first signal with an amplitude value of the setting signal, obtains a compare result, and generate, based on the compare result, a control signal to adjust the impedance of the adjustable impedance tube. The control signal adjusts the impedance of the adjustable impedance tube through controlling a voltage or current at the control terminal of the adjustable impedance tube.

The impedance of the adjustable impedance tube S is adjusted, to make the instantaneous value of the current flowing through the load not exceed the amplitude value of a current set by the setting signal, thus the ripple of the current output by the current source is reduced.

In practice, the speed of the control circuit loop is faster than the speed of an internal current loop of the current source.

In the circuit for reducing the ripple of the current output by the current source according to the embodiment, since the setting signal depends on the average value of the direct current output by the current source, the setting signal may vary with the average value of the direct current and may not be a fixed value. Thus, ripple components of current sources with different current amplitudes can be reduced. Furthermore, the circuit is also applicable to an LED driver having dimming function. In a case that a direct current output by the LED driver varies in a dimming progress, the average value of the direct current varies as well, and accordingly, the setting signal varies with the average value of the direct current, thereby effectively reducing the ripple component.

Figure 2:
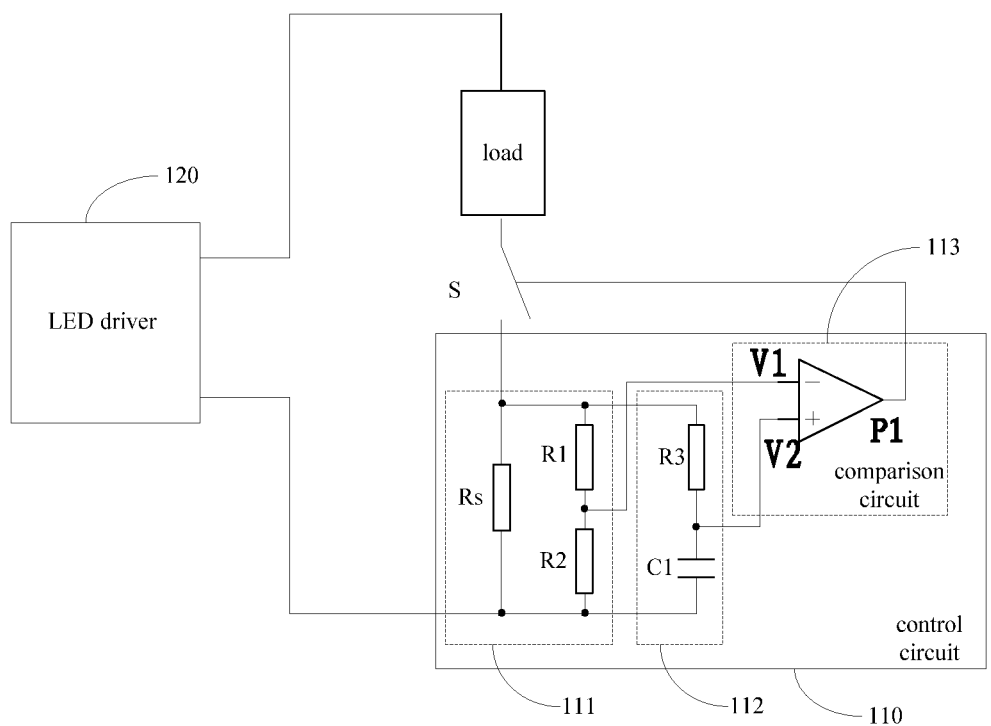
FIG. 2 is a schematic diagram of a circuit for reducing a ripple of a current output by a current source according to another embodiment of the present disclosure.

Reference is made to FIG. 2, which is a schematic diagram of a circuit for reducing a ripple of a current output by an LED driver according to another embodiment of the present disclosure and refines in detail the control circuit according to the embodiment corresponding to FIG. 1.

The control circuit includes a first signal acquisition circuit 111, a setting signal acquisition circuit 112, and a comparison circuit 113.

The first signal acquisition circuit 111 is configured to sense a direct current output by an LED driver 120, obtain a first signal in proportion to the direct current, and transmit the first signal to a first input terminal of the comparison circuit 113.

Specifically, as shown in the figure, the first signal acquisition circuit 111 may include a sense resistor Rs, a first resistor R1, and a second resistor R2.

The sense resistor Rs is connected with the adjustable impedance tube and an output terminal of the LED driver 120.

The first resistor R1 and the second resistor R2 are connected in series and then connected in parallel to the sense resistor Rs, and a common terminal of the first resistor R1 and the second resistor R2 is connected to the first input terminal of the comparison circuit 113.

A voltage drop is caused across the sense resistor Rs due to the direct current flowing through the load, and the voltage drop is divided by the first resistor R1 and the second resistor R2 to obtain the first signal.

Supposing that the direct current flowing through the load is I, the first signal is I*Rs*R2/(R1+R2).

The setting signal acquisition circuit 112 is configured to sense an average value of the direct current output by the LED driver 120, obtain the setting signal, and transmit the setting signal to a second input terminal of the comparison circuit 113. Specifically, the setting signal is higher than the average value of the first signal by a fixed value, or, the setting signal is in a fixed proportion to the average value of the first signal, and the fixed proportion is equal to or larger than 1.

In practice, the setting signal acquisition circuit 112 may include a third resistor R3 and a first capacitor C1. The third resistor R3 and the first capacitor C1 are connected in series and then connected in parallel to the sense resistor Rs, and a common terminal of the third resistor R3 and the first capacitor C1 is connected to the second input terminal of the comparison circuit 113. The setting signal acquisition circuit 112 senses the direct current of the load through the sense resistor Rs, and performs a filtering process on a sampling signal on the sense resistor Rs by using the third resistor R3 and the first capacitor C1, to obtain the setting signal.

Supposing that the direct current flowing through the load is I, the sampling signal on the sense resistor Rs is I*Rs; after the filtering by the third resistor R3 and the first capacitor C1, a filtered signal of the direct current, i.e., an average value Ia of the direct current I, is obtained; and accordingly, the setting signal is Ia*Rs, and the average value of the first signal I*Rs*R2/(R1+R2) is Ia*Rs*R2/(R1+R2). Thus, according to the embodiment, the setting signal is in a fixed proportion to the average value of the first signal, and the proportion is (R1+R2)/R2, which is greater than 1.

In practical implementation of the present disclosure, the fixed proportion may be in range of 1.09~1.9, i.e., the setting signal is 1.09~1.9 times the average value of the first signal, and the exact value of the fixed proportion is determined by a ripple peak of the direct current output by the current source.

A current set by the setting signal is the ratio of a voltage amplitude value of the setting signal to a proportion coefficient, where the proportion coefficient is an equivalent resistor which is used to obtain the first signal.

Specifically, in a case that the first signal is the voltage on the sense resistor Rs, the equivalent resistor is the sense resistor Rs; in a case that the first signal is obtained through the first signal acquisition circuit shown in FIG. 2, the equivalent resistor is Rs*R2/(R1+R2).

Supposing that the average value of the direct current is 1 A and the ripple peak is 0.5 A, the direct current has a maximum value of 1.5 A and a minimum value of 0.5 A, and the value of the current set by the setting signal may be greater than 1.0 A and less than 1.5 A. In this way, as long as the maximum value of the direct current flowing through the load is no greater than the value of the current set by the setting signal, the peak of the direct current flowing through the load is reduced. On the other hand, since the current source is capable of ensuring that the average value of the output direct current keeps constant, reducing the peak of the direct current leads to the increase of the minimum value of the direct current, thus reducing the ripple.

An output terminal of the comparison circuit 113 is connected to the control terminal of the adjustable impedance tube S. If it is sensed that an instantaneous value of the first signal is greater than the amplitude value of the setting signal, a control signal for increasing the impedance of the adjustable impedance tube is generated.

In practice, the comparison circuit 113 may be implemented as an operational amplifier.

The adjustable impedance tube S may be a MOS transistor or a triode. In a case that the adjustable impedance tube S is an N-type transistor (e.g., an N-type MOS transistor or an NPN triode), the first input terminal of the comparison circuit is an inverting input terminal of the operational amplifier, and the second input terminal is a non-inverting input terminal of the operational amplifier. In a case that the adjustable impedance tube S is a P-type transistor (e.g., a P-type MOS transistor or a PNP triode), the first input terminal of the comparison circuit is a non-inverting input terminal of the operational amplifier, and the second terminal is an inverting input terminal of the operational amplifier. The case that the adjustable impedance tube S is an N-type transistor is taken as an example in the embodiment, the first input terminal of the comparison circuit is the inverting input terminal of the operational amplifier, and the second terminal is the non-inverting input terminal of the operational amplifier.

Since the first signal is in proportion to the direct current output by the current source and the setting signal is in proportion to the average value of the first signal, comparing the first signal with the setting signal is equivalent to comparing the direct current output by the current source with the current set by the setting signal. In a case that the instantaneous value of the direct current is greater than the amplitude value of the current set by the setting signal, the impedance of the adjustable impedance tube S is increased. Since the amplitude value of the current set by the setting signal is greater than the average value of the direct current output by the current source, a system including the current source, the control circuit, and the adjustable impedance tube may be in a steady state, i.e., an amplitude value of a voltage across output terminals of the current source remains approximately constant and has slight fluctuation. Since the impedance of a load of the current source increases as the impedance of the adjustable impedance tube S increases, and the voltage across the output terminals of the current source remains approximately constant, the current of the load decreases such that the first signal is ensured to be equal to the setting signal. Therefore, the maximum value of the current flowing through the load does not exceed the amplitude value of the current set by the setting signal, and accordingly, the ripple of the current output by the current source is reduced.

According to the embodiment, the setting signal depends on the average value of the direct current output by the LED driver and varies with the average value of the direct current; hence, ripple components of LED drivers with different current amplitude values can be reduced.

Furthermore, the circuit for reducing the ripple of the current output by the LED driver according to the embodiment is also applicable to an LED driver having dimming function. In a case that the direct current output by the LED driver varies in a dimming progress, the average value of the direct current varies in the dimming progress as well, the setting signal also varies with the average value of the direct current; accordingly, the ripple component is effectively reduced. In a case that the amplitude value of the current set by the setting signal is in proportion to the average value of the direct current, the circuit according to the embodiment may allow ripple components of different direct currents in the dimming process to be controlled within a certain proportional range. In a case that the amplitude value of the current set by the setting signal is greater than the average value of the direct current by a fixed value, the circuit according to the embodiment may allow amplitude values of ripples of different direct currents to be controlled within a certain amplitude value range in the dimming process.

In addition, according to the embodiment, in a case that the first signal for sensing the direct current is input into the inverting input terminal of the operational amplifier, the average value of the first signal is obtained through approaches such as filtering, and an appropriate level signal smaller than the average value is superposed to the average value. A signal obtained after superposition may be taken as the setting signal, such that it is realized that the amplitude value of the current set by the setting signal is greater than the average value of the direct current by a fixed value.

Figure 3:
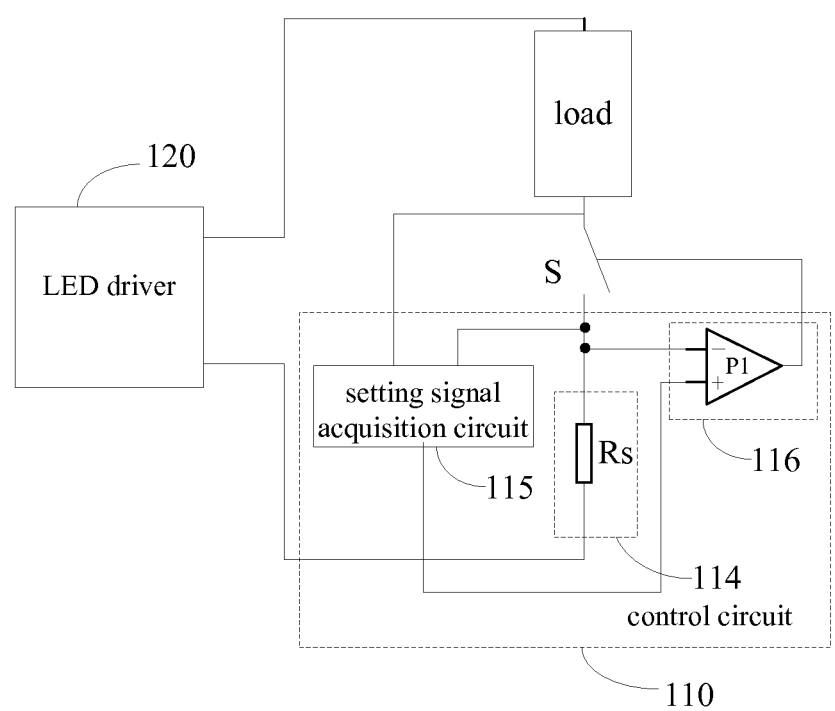
FIG. 3 is a schematic diagram of another circuit for reducing a ripple of a current output by a current source according to an embodiment of the present disclosure.

Reference is made to FIG. 3, which is a schematic diagram of another circuit for reducing a ripple of a current output by an LED driver according to an embodiment of the present disclosure. Another specific implementation of the control circuit according to the embodiment corresponding to FIG. 1 is provided in the present embodiment, and a setting signal according to the present embodiment is different from the setting signal according to the embodiment corresponding to FIG. 2.

Specifically, the control circuit includes a first signal acquisition circuit 114, a setting signal acquisition circuit 115, and a comparison circuit 116.

The first signal acquisition circuit 114 is configured to sense a direct current output by an LED driver 120, obtain a first signal in proportion to the direct current, and transmit the first signal to a first input terminal of the comparison circuit 116.

Specifically, the first signal acquisition circuit 114 may be a sense resistor Rs, a first terminal of the sense resistor Rs is connected to a second terminal of the adjustable impedance tube S and the other terminal of the sense resistor Rs is connected to an output terminal of the LED driver 120, and the first terminal of the sense resistor Rs is connected to the first input terminal of the comparison circuit 116.

The figure shows that, the first signal is a voltage drop across the sense resistor Rs which is generated due to the direct current output by the LED driver 120.

The setting signal acquisition circuit 115 is configured to sense a voltage across the adjustable impedance tube S, adjust a setting signal according to the voltage across the adjustable impedance tube S, and transmits the setting signal to the comparison circuit.

Specifically, a first input terminal of the setting signal acquisition circuit is connected to a first terminal of the adjustable impedance tube S, a second input terminal of the setting signal acquisition circuit is connected to the second terminal of the adjustable impedance tube S, and an output terminal of the setting signal acquisition circuit is connected to a second input terminal of the comparison circuit 116.

The setting signal acquisition circuit 115 is specifically configured to sense the voltage across the adjustable impedance tube S in real time and adjust the amplitude of the output setting signal, such that the voltage across the adjustable impedance tube S is within a preset range and it is further ensured that the instantaneous value of the direct current flowing through the load does not exceed the amplitude of the current set by the setting signal.

Specifically, the setting signal output by the setting signal acquisition circuit 115 includes the following three cases.

If the voltage across the adjustable impedance tube S is sensed to be within the preset range, the setting signal is maintained at a current value.

If the voltage across the adjustable impedance tube S is sensed to be less than a lower limit value of the preset range, the amplitude of the setting signal is decreased until the voltage across the adjustable impedance tube S falls within the preset range or the setting signal reaches a minimum value.

In practical implementation, if the voltage across the adjustable impedance tube S is less than the lower limit value of the preset range, the amplitude of the setting signal is decreased, and the decrease of the amplitude of the setting signal leads to the increase of the voltage across the adjustable impedance tube S. Then, the voltage across the adjustable impedance tube S is sensed again, if the voltage across the adjustable impedance tube S is still less than the lower limit value of the preset range, the amplitude of the setting signal is further decreased until the voltage across the adjustable impedance tube S falls within the preset range or the setting signal is decreased to the minimum value.

In a case that the voltage across the adjustable impedance tube S is sensed to be greater than an upper limit value of the preset range, the amplitude value of the setting signal is increased until the voltage across the adjustable impedance tube S falls within the preset range.

The above preset range may be substituted for a preset value; that is to say, the voltage across the adjustable impedance tube S is sensed and compared with the preset value, and the amplitude value of the current setting signal is adjusted based on the comparison result.

It should be noted that, the lower limit value of the preset range for the voltage across the adjustable impedance tube S is greater than a saturation voltage drop of the adjustable impedance tube S.

The comparison circuit 116 is configured to, compare the first signal with the setting signal, and generate a control signal for increasing the impedance of the adjustable impedance tube in a case that an instantaneous value of the first signal is greater than the amplitude value of the setting signal.

Specifically, the comparison circuit 116 may be implemented as an operational amplifier P1, the first input terminal of the comparison circuit is an inverting input terminal of the operational amplifier P1, and the second input terminal of the comparison circuit is a non-inverting input terminal of the operational amplifier P1.

Since the lower limit value of the preset range for the voltage across the adjustable impedance tube S is greater than the saturation voltage drop of the adjustable impedance tube S, in a case that the voltage across the adjustable impedance tube S does not exceed the preset range under the control signal output by the comparison circuit 116, the adjustable impedance tube S operates at a linear state.

The setting signal has a minimum value, the current of the load set by the minimum value is greater than the average value of the direct current output by the current source, and the control circuit makes the current of the load not exceed the current set by the setting signal. Thus, if the control circuit senses that the voltage across the adjustable impedance tube S is less than the lower limit value of the preset range and meanwhile the setting signal has already reached the minimum value and cannot be further decreased, an instantaneous value of the current of the load is no doubt less than the average value of the direct current. If the control circuit senses that the voltage across the adjustable impedance tube S is less than the lower limit value of the preset range and meanwhile the setting signal is greater than the minimum value, the voltage across the adjustable impedance tube S may fall within the preset range by decreasing the value of the setting signal, the impedance of the adjustable impedance tube increases and the adjustable impedance tube operates at the linear state; accordingly, an instantaneous value of the current of the load is no doubt less than an instantaneous value of a current of the load which is not connected to the control circuit and the adjustable impedance tube. Thus, ripple component of the direct current flowing through the load may be reduced.

A work process of the circuit for reducing the ripple of the current output by the current source according to the embodiment is described as follows.

In a case that the instantaneous value of the first signal obtained by the first signal acquisition circuit is greater than the amplitude value of the setting signal, an electrical signal output by the comparison circuit controls the impedance of the adjustable impedance tube S to increase, such that the voltage across the adjustable impedance tube S is decreased and falls within the preset range, and ripple component of the direct current flowing through the load is reduced;

in a case that the instantaneous value of the first signal obtained by the first signal acquisition circuit is less than the amplitude value of the setting signal, an electrical signal output by the comparison circuit controls the impedance of the adjustable impedance tube S to decrease, such that the voltage across the adjustable impedance tube S is increased and falls within the preset range, and loss of the adjustable impedance tube S is avoided from being high.

It should be noted that, the direct current flowing through the load according to the embodiment of the present disclosure is the direct current output by the LED driver.

The circuit for reducing the ripple output by the LED driver according to the embodiment sets the amplitude value of the setting signal based on the sensed voltage across the adjustable impedance tube S, compares the instantaneous value of the first signal in proportion to the direct current flowing through the load with the amplitude value of the setting signal, and adjusts the impedance of the adjustable impedance tube S, such that the amplitude value of the first signal does not exceed the amplitude value of the setting signal, and the direct current flowing through the load may not exceed the amplitude value of the current set by the setting signal, thereby reducing ripple component of the direct current flowing through the load.

In the circuit for reducing the ripple of the current output by the LED driver according to the embodiment, the amplitude value of the current set by the setting signal is not a fixed value and depends on the average value of the direct current output by the LED driver; hence, the circuit for reducing the ripple of the current output by the LED driver according to the embodiment is applicable to LED drivers with different current amplitudes, and ripple components of these LED drivers can be reduced. Furthermore, the circuit for reducing the ripple of the current output by the LED driver is also applicable to an LED driver having a dimming function. When the LED driver performs a dimming operation, the average value of the direct current output by the LED driver varies, the current set by the setting signal varies with the average value of the direct current output by the LED driver, and accordingly, ripple component is effectively reduced. In a case that the amplitude value of current set by the setting signal is in proportion to the average value of the direct current, the circuit according to the embodiment may control the ripple components of different direct currents within a certain proportional range during the dimming process.

It should be noted that, since the setting signal in the present disclosure is used to limit the maximum value of the direct current output by the current source and should match a current loop which is located inside the current source and is for setting the average value of the output current, the amplitude value of the current set by the setting signal can not be less than the amplitude value of the current set by the current loop inside the current source (i.e., the average value of the direct current output by the current source). That is to say, the setting signal has a minimum value, and the current set by the setting signal of the minimum value is no less than the average value of the direct current output by the current source. Otherwise, the circuit for reducing the ripple of the current output by the current source according to the embodiment may affect normal operation of the current loop inside the current source, and the working state of the current source may change.

Corresponding to the circuit for reducing the ripple of the current output by the current source according to the above-mentioned embodiments, a method for reducing the ripple of the current output by the current source is further provided in the present disclosure.

Figure 4:
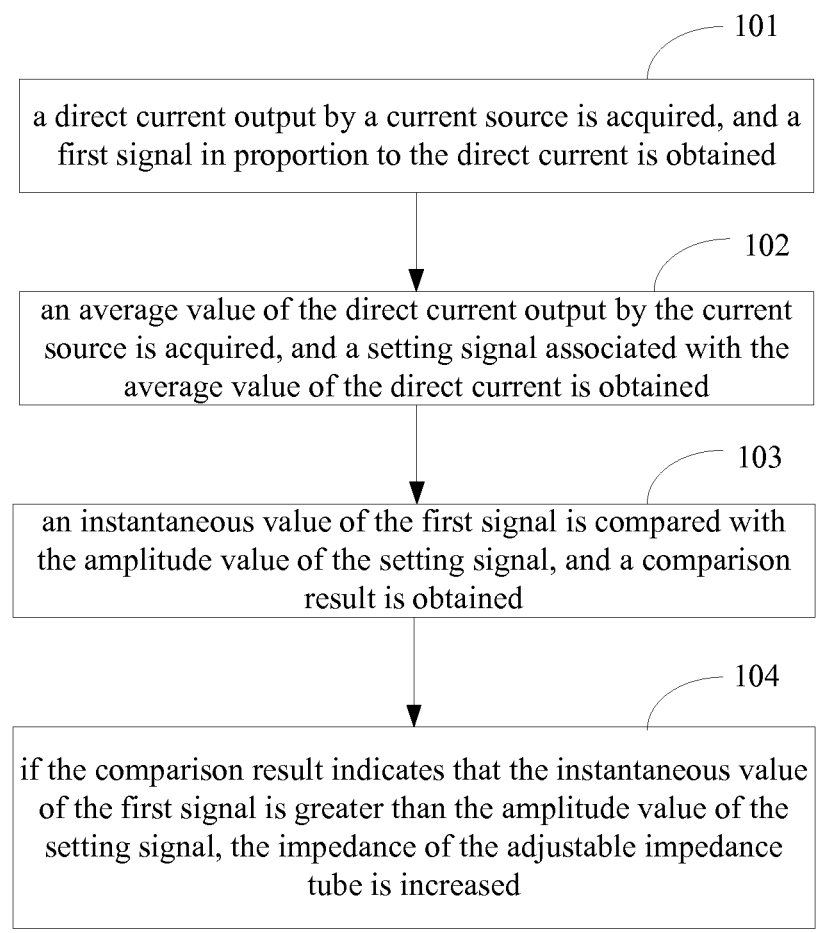
FIG. 4 is a flow chart of a method for reducing a ripple of a current output by a current source according to an embodiment of the present disclosure.

Reference is made to FIG. 4, which illustrates a flow chart of a method for reducing a ripple of a current output by a current source according to an embodiment of the present disclosure. The method is applied to a circuit for reducing the ripple of the current output by the current source, where the circuit at least includes an adjustable impedance tube and a control circuit for controlling the impedance of the adjustable impedance tube, the adjustable impedance tube and a load are connected in series between output terminals of the current source. The method includes the following steps 101-104.

In 101, a direct current output by a current source is acquired, and a first signal in proportion to the direct current is obtained.

In 102, an average value of the direct current output by the current source is acquired, and a setting signal associated with the average value of the direct current is obtained.

In practical implementation, the setting signal may be higher than the average value of the direct current output by the current source by a fixed value, or the setting signal may be a voltage signal in proportion to the average value of the direct current. If the setting signal is in proportion to the average value of the direct current, the amplitude value of the setting signal may be K times the average value of the first signal. According to a specific embodiment, K is in range of 1.01~1.9.

Alternatively, the setting signal may be a voltage signal of which the amplitude value varies with a voltage across the adjustable impedance tube S. Specifically, the voltage signal has a minimum value, and a current signal set by the voltage signal of the minimum value is no less than the average value of the direct current output by the current source.

In 103, an instantaneous value of the first signal is compared with the amplitude value of the setting signal, and a comparison result is obtained.

In 104, if the comparison result indicates that the instantaneous value of the first signal is greater than the amplitude value of the setting signal, the impedance of the adjustable impedance tube is increased, such that the amplitude value of the first signal is not greater than the amplitude value of the setting signal.

If the instantaneous value of the first signal is greater than the amplitude value of the setting signal, it indicates that the direct current flowing through the load is greater than the amplitude value of the current set by the setting signal. In this case, the impedance of the adjustable impedance tube is increased, such that the direct current flowing through the load is reduced, and finally, ripple component of the direct current flowing through the load is reduced.

Figure 5:
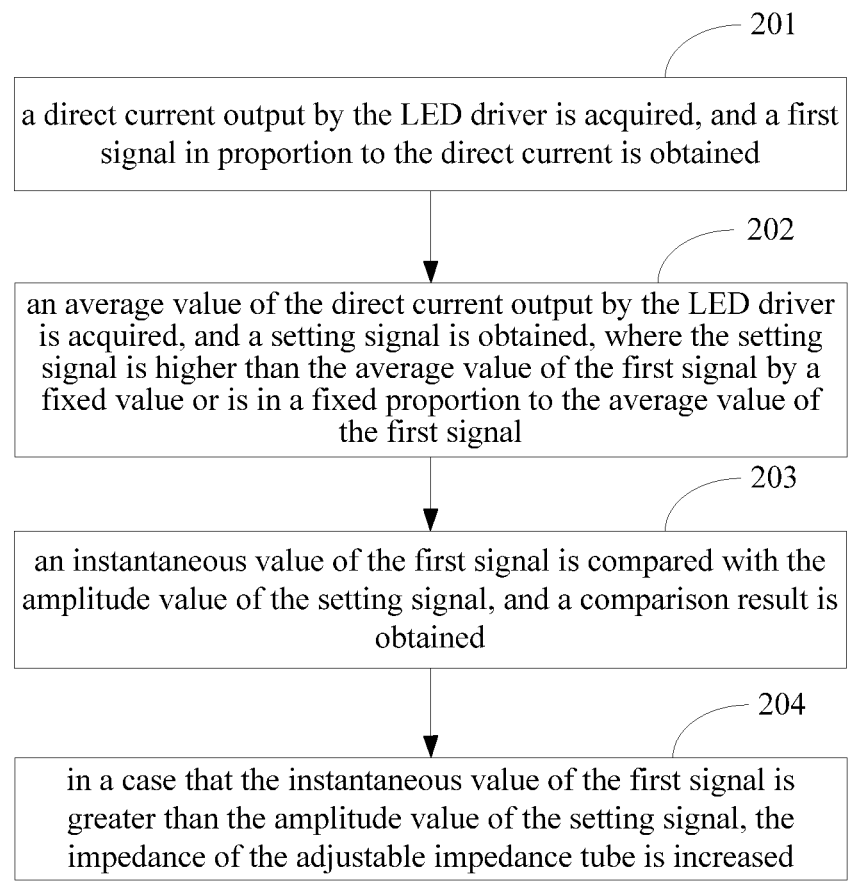
FIG. 5 is a flow chart of a method for reducing a ripple of a direct current output by a current source according to another embodiment of the present disclosure.

Reference is made to FIG. 5, which illustrates a flow chart of a method for reducing a ripple of a current output by an LED driver according to another embodiment of the present disclosure. The method is applied to a circuit for reducing the ripple of the current output by the LED driver, where the circuit at least includes an adjustable impedance tube and a control circuit for controlling the impedance of the adjustable impedance tube, the adjustable impedance tube and a load are connected in series between output terminals of the LED driver. The method includes the following steps 201-204.

In 201, a direct current output by the LED driver is acquired, and a first signal in proportion to the direct current is obtained.

In 202, an average value of the direct current output by the LED driver is acquired, and a setting signal is obtained, where the setting signal is higher than the average value of the first signal by a fixed value or is in a fixed proportion to the average value of the first signal.

In 203, an instantaneous value of the first signal is compared with the amplitude value of the setting signal, and a comparison result is obtained.

In 204, in a case that the instantaneous value of the first signal is greater than the amplitude value of the setting signal, the impedance of the adjustable impedance tube is increased.

In the method for reducing the ripple of the current output by the current source according to the embodiment, the current set by the setting signal depends on the average value of the direct current output by the current source. If it is sensed that the direct current output by the current source exceeds the amplitude value of current set by the setting signal, the impedance of the adjustable impedance tube S is increased, and accordingly, a load impedance of the current source is increased. Since the voltage across output terminals of the current source in steady state is nearly constant, the current flowing through the load is decreased, such that the maximum value of the current flowing through the load does not exceed the amplitude value of the current set by the setting signal, thereby reducing ripple component of the direct current output by the current source.

According to the embodiment, the setting signal depends on the average value of the direct current output by the current source and may not be a fixed value; hence, the circuit for reducing the ripple of the current output by the current source according to the embodiment can reduce ripple components for current sources with different current amplitude values.

Furthermore, the method for reducing the ripple of the current output by the current source according to the embodiment is also applicable to a current source having a dimming function. When the direct current output by the current source varies in a dimming process, the average value of the direct current also varies in the dimming process, and the setting signal varies with the average value of the direct current; hence, ripple component is effectively reduced.

In a case that the amplitude value of the current set by the setting signal is in proportion to the average value of the direct current, ripple components of different direct currents can be controlled within a certain proportional range in the dimming process. In a case that the amplitude value of the current set by the setting signal is greater than the average value of the direct current by a fixed value, the circuit according to the embodiment can control amplitudes of ripples of different direct currents within a certain amplitude value range in the dimming process.

Figure 6:
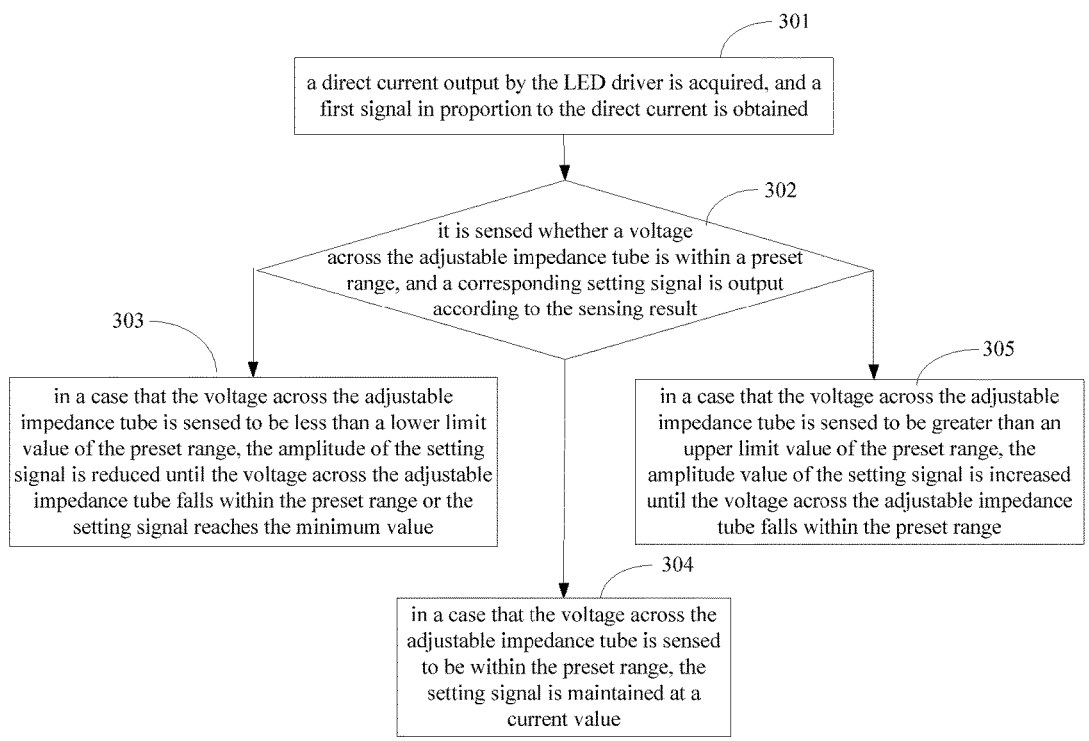
FIG. 6 is a flow chart of another method for reducing a ripple of a direct current output by a current source according to an embodiment of the present disclosure.

Reference is made to FIG. 6, which illustrates a flow chart of another method for reducing a ripple of a current output by an LED driver according to an embodiment of the present disclosure. The method is applied to a circuit for reducing the ripple of the current output by the LED driver, where the circuit at least includes an adjustable impedance tube and a control circuit for controlling the impedance of the adjustable impedance tube, the adjustable impedance tube and a load are connected in series between output terminals of the LED driver. The method includes the following steps 301-306.

In 301, a direct current output by the LED driver is acquired, and a first signal in proportion to the direct current is obtained.

In 302, it is sensed whether a voltage across the adjustable impedance tube is within a preset range, and a corresponding setting signal is output according to the sensing result;

where the setting signal has a minimum value.

In 303, in a case that the voltage across the adjustable impedance tube is sensed to be less than a lower limit value of the preset range, the amplitude of the setting signal is reduced until the voltage across the adjustable impedance tube falls within the preset range or the setting signal reaches the minimum value.

The lower limit value of the preset range is greater than a saturation voltage drop of the adjustable impedance tube.

In 304, in a case that the voltage across the adjustable impedance tube is sensed to be within the preset range, the setting signal is maintained at a current value.

In 305, in a case that the voltage across the adjustable impedance tube is sensed to be greater than an upper limit value of the preset range, the amplitude value of the setting signal is increased until the voltage across the adjustable impedance tube falls within the preset range.

In 306, an instantaneous value of the first signal is compared with the amplitude value of the setting signal; in a case that the instantaneous value of the first signal is greater than the amplitude value of the setting signal, the impedance of the adjustable impedance tube is increased, such that the amplitude value of the first signal does not exceed the amplitude value of the setting signal.

In the method for reducing the ripple output by the LED driver according to the embodiment, the amplitude value of the setting signal is set based on the sensed voltage across the adjustable impedance tube S, the instantaneous value of the first signal is compared with the amplitude value of the setting signal, and the impedance of the adjustable impedance tube S is adjusted, such that the amplitude value of the first signal does not exceed the amplitude value of the setting signal, and finally the direct current flowing through the load does not exceed the amplitude value of the current set by the setting signal, thereby reducing ripple component of the direct current flowing through the load.

In the circuit for reducing the ripple of the current output by the LED driver according to the embodiment, the amplitude value of current set by the setting signal is not a fixed value and depends on the average value of the direct current output by the LED driver; hence, the circuit for reducing the ripple of the current output by the LED driver according to the embodiment is applicable to LED drivers with different current amplitudes, and ripple components of the LED drivers can be reduced. Furthermore, the circuit for reducing the ripple of the current output by the LED driver according to the embodiment is also applicable to an LED driver having a dimming function. When the LED driver performs a dimming operation, the average value of the output direct current varies, and the current set by the setting signal varies with the average value of the direct current output by the LED driver, thereby reducing ripple component effectively.

It should be noted that, in the present disclosure, relational terms such as "the first" and "the second" are only intended to distinguish an entity or an operation from another entity or another operation, and it does not necessarily require or indicate there is any such actual relationship or order.

What described above are only specific implementations of the present disclosure. It should be noted that, those skilled in the art may make improvements and embellishments without departing from the principle of the present disclosure, and these improvements and embellishments should fall within the protection scope of the present disclosure.

The invention claimed is:

1. A circuit for reducing a ripple of a current output by a current source, wherein an output terminal of the current source is connected to a load and a current output by the current source has a ripple, wherein the circuit comprises an adjustable impedance tube and a control circuit;
the adjustable impedance tube is connected in series with the load through a first terminal and a second terminal of the adjustable impedance tube, and a control terminal of the adjustable impedance tube is connected to an output terminal of the control circuit; and
the control circuit is configured to, acquire a direct current output by the current source and obtain a first signal in proportion to the direct current; acquire an average value of the direct current output by the current source and obtain a setting signal associated with the average value of the direct current; and output a control signal for increasing an impedance of the adjustable impedance tube in a case that an instantaneous value of the first signal is sensed to be greater than an amplitude value of the setting signal; wherein the control signal adjusts the impedance of the adjustable impedance tube through controlling a voltage or a current at the control terminal of the adjustable impedance tube.

2. The circuit according to claim 1, wherein the control circuit comprises a first signal acquisition circuit, a setting signal acquisition circuit and a comparison circuit;
the first signal acquisition circuit is configured to, acquire the direct current output by the current source, obtain the first signal in proportion to the direct current, and transmit the first signal to the comparison circuit;
the setting signal acquisition circuit is configured to, acquire the average value of the direct current output by the current source, obtain the setting signal, and transmit the setting signal to the comparison circuit, wherein the setting signal is higher than the average value of the first signal by a fixed value or is in a fixed proportion to the average value of the first signal; and
the comparison circuit is configured to, compare the received first signal with the setting signal, and generate the control signal for increasing the impedance of the adjustable impedance tube in a case that the instantaneous value of the first signal is greater than the amplitude value of the setting signal, to increase the impedance of the adjustable impedance tube and to ensure that the instantaneous value of the first signal does not exceed the amplitude value of the setting signal.

3. The circuit according to claim 2, wherein
the first signal acquisition circuit comprises a sense resistor, a first resistor, and a second resistor;
the sense resistor is connected in series with the adjustable impedance tube;
the first resistor and the second resistor are connected in series and then connected in parallel to the sense resistor;
wherein the setting signal acquisition circuit comprises a third resistor and a first capacitor, and the third resistor and the first capacitor are connected in series and then connected in parallel to the sense resistor; and
wherein a first input terminal of the comparison circuit is connected to a common terminal of the first resistor and the second resistor, a second input terminal of the comparison circuit is connected to a common terminal of the third resistor and the first capacitor, and an output terminal of the comparison circuit is connected to the control terminal of the adjustable impedance tube.

4. The circuit according to claim 1, wherein
the control circuit comprises a first signal acquisition circuit, a setting signal acquisition circuit and a comparison circuit;
the first signal acquisition circuit is configured to, acquire the direct current output by the current source, obtain the first signal in proportion to the direct current, and transmit the first signal to the comparison circuit;
the setting signal acquisition circuit is configured to, acquire a voltage across the adjustable impedance tube, dynamically adjust the output setting signal based on a result of a comparison between the voltage across the adjustable impedance tube and a preset range, and transmit the setting signal to the comparison circuit; wherein the setting signal has a minimum value, and a current set by the setting signal of the minimum value is no less than the average value of the direct current output by the current source, and a lower limit value of the preset range is greater than a saturation voltage drop of the adjustable impedance tube; and
the comparison circuit is configured to, compare an instantaneous value of the first signal with an amplitude value of the setting signal, and generate the control signal for increasing the impedance of the adjustable impedance tube in a case that the instantaneous value of the first signal is greater than the amplitude value of the setting signal, to increase the impedance of the adjustable impedance tube and to ensure that the amplitude value of the first signal does not exceed the amplitude value of the setting signal.

5. The circuit according to claim 4, wherein
the first signal acquisition circuit comprises a sense resistor, one terminal of the sense resistor is connected to the second terminal of the adjustable impedance tube, the other terminal of the sense resistor is connected to an output terminal of the current source, and a common terminal of the sense resistor and the adjustable impedance tube is connected to a first input terminal of the comparison circuit;
a first terminal of the setting signal acquisition circuit is connected to the first terminal of the adjustable impedance tube, a second terminal of the setting signal acquisition circuit is connected to the second terminal of the adjustable impedance tube, and an output terminal of the setting signal acquisition circuit is connected to a second input terminal of the comparison circuit; and
an output terminal of the comparison circuit is connected to the control terminal of the adjustable impedance tube.

6. The circuit according to claim 5, wherein the setting signal acquisition circuit is specifically configured to:
in a case that the voltage across the adjustable impedance tube is sensed to be within the preset range, maintain the setting signal at a current value;
in a case that the voltage across the adjustable impedance tube is sensed to be less than the lower limit value of the preset range, decrease the amplitude value of the setting signal until the voltage across the adjustable impedance tube falls within the preset range or the setting signal reaches the minimum value; and
in a case that the voltage across the adjustable impedance tube is sensed to be greater than an upper limit value of the preset range, increase the amplitude value of the setting signal until the voltage across the adjustable impedance tube falls within the preset range.

7. A method for reducing a ripple of a current output by a current source, which is applied to a circuit for reducing the ripple of the current output by the current source, wherein the circuit for reducing the ripple of the current output by the current source at least comprises an adjustable impedance tube and a control circuit for controlling an impedance of the adjustable impedance tube, and the adjustable impedance tube and a load are connected in series between output terminals of the current source; wherein the method comprises:

acquiring a direct current output by the current source, and obtaining a first signal in proportion to the direct current;

acquiring an average value of the direct current output by the current source, and obtaining a setting signal associated with the average value of the direct current;

comparing an instantaneous value of the first signal with an amplitude value of the setting signal, and obtaining a comparison result; and increasing the impedance of the adjustable impedance tube to ensure that the amplitude value of the first signal does not exceed the amplitude value of the setting signal, in a case that the comparison result indicates that the instantaneous value of the first signal is greater than the amplitude value of the setting signal.

8. The method according to claim 7, wherein the setting signal is higher than the average value of the first signal by a fixed value, or the setting signal is in a fixed proportion to the average value of the first signal.

9. The method according to claim 7, wherein after acquiring the average value of the direct current output by the current source and before obtaining the setting signal, the method further comprises:

sensing a voltage across the adjustable impedance tube, and dynamically adjusting the amplitude value of the output setting signal based on a result of a comparison between the voltage across the adjustable impedance tube and a preset range, wherein the setting signal has a minimum value, a current set by the setting signal of the minimum value is no less than the average value of the direct current output by the current source, and a lower limit value of the preset range is greater than a saturation voltage drop of the adjustable impedance tube.

10. The method according to claim 9, wherein the dynamically adjusting the amplitude value of the setting signal based on a result of a comparison between the voltage across the adjustable impedance tube and a preset range specifically comprises:

in a case that the voltage across the adjustable impedance tube is sensed to be within the preset range, maintaining the setting signal at a current value;

in a case that the voltage across the adjustable impedance tube is sensed to be less than the lower limit value of the preset range, decreasing the amplitude value of the setting signal until the voltage across the adjustable impedance tube falls within the preset range or the setting signal reaches the minimum value; and in a case that the voltage across the adjustable impedance tube is sensed to be greater than an upper limit value of the preset range, increasing the amplitude value of the setting signal until the voltage across the adjustable impedance tube falls within the preset range.

* * * * *